US009574928B2

(12) United States Patent
Periyathamby et al.

(10) Patent No.: US 9,574,928 B2
(45) Date of Patent: Feb. 21, 2017

(54) LIQUID LEVEL SENSING SYSTEMS

(71) Applicant: Goodrich Corporation, Charlotte, NC (US)

(72) Inventors: Sabeshan Sean Periyathamby, Copley, OH (US); Jon Shearer, Hartville, OH (US); Martin Lei, Canal Fulton, OH (US); John A. Harr, Minerva, OH (US); Bryan J. Mackulin, Akron, OH (US)

(73) Assignee: Goodrich Corporation, Charlotte, NC (US)

( * ) Notice: Subject to any disclaimer, the term of this patent is extended or adjusted under 35 U.S.C. 154(b) by 179 days.

(21) Appl. No.: 14/318,181

(22) Filed: Jun. 27, 2014

(65) Prior Publication Data

US 2014/0305202 A1 Oct. 16, 2014

Related U.S. Application Data

(63) Continuation-in-part of application No. 13/765,231, filed on Feb. 12, 2013, now Pat. No. 9,261,395.

(60) Provisional application No. 61/868,412, filed on Aug. 21, 2013, provisional application No. 61/598,320, filed on Feb. 13, 2012.

(51) Int. Cl.
*G01F 23/26* (2006.01)
(52) U.S. Cl.
CPC .................. *G01F 23/268* (2013.01)
(58) Field of Classification Search
None
See application file for complete search history.

(56) References Cited

U.S. PATENT DOCUMENTS

| 2,950,601 A | 8/1960 | Wightman |
| 3,986,110 A | 10/1976 | Overall et al. |
| 4,235,106 A | 11/1980 | Maltby et al. |
| 4,389,900 A | 6/1983 | Gutierrez |

(Continued)

FOREIGN PATENT DOCUMENTS

| DE | 3504493 A1 | 8/1986 |
| DE | 10063557 A1 | 7/2002 |

(Continued)

OTHER PUBLICATIONS

Search Report Issued by the European Patent Office on May 31, 2013 for EP Application No. 13155124.4.

(Continued)

*Primary Examiner* — Andre Allen
(74) *Attorney, Agent, or Firm* — Locke Lord LLP; Alicia J. Carroll; Scott D. Wofsy

(57) ABSTRACT

A liquid level sensing system includes a vessel and an electrode. The vessel includes a vessel wall separating a vessel interior from a vessel exterior. The electrode is mounted to an exterior side of the vessel wall spanning a distance corresponding to a desired-level-determining range. The vessel wall is a dielectric gap between the electrode and the vessel interior. The electrode is configured to collect a charge corresponding to a liquid level. A method for determining a liquid level in a vessel includes collecting a charge on an electrode, sensing the collected charge on the electrode with a capacitance sensor through an electrical line, and determining a liquid level in a vessel based on the collected charge sensed by the capacitance sensor.

16 Claims, 2 Drawing Sheets

(56) References Cited

U.S. PATENT DOCUMENTS

| | | | |
|---|---|---|---|
| 4,412,270 A | 10/1983 | Weitz, Jr. et al. | |
| 4,412,450 A | 11/1983 | Franz et al. | |
| 4,449,405 A | 5/1984 | Franz et al. | |
| 4,540,936 A | 9/1985 | Walsh | |
| 4,553,434 A | 11/1985 | Spaargaren | |
| 4,591,946 A | 5/1986 | Pope | |
| 4,676,101 A | 6/1987 | Baughman | |
| 4,736,638 A | 4/1988 | Okawa et al. | |
| 4,912,976 A | 4/1990 | Labriola, II | |
| 4,924,702 A | 5/1990 | Park | |
| 5,027,075 A | 6/1991 | Harding, Jr. | |
| 5,081,696 A | 1/1992 | Beck | |
| 5,156,047 A | 10/1992 | Tuma et al. | |
| 5,270,210 A | 12/1993 | Weyrauch et al. | |
| 5,315,872 A | 5/1994 | Moser | |
| 5,765,434 A | 6/1998 | Harbaugh | |
| 6,075,464 A | 6/2000 | Cloutier et al. | |
| 6,490,920 B1 | 12/2002 | Netzer | |
| 6,563,328 B1 | 5/2003 | Lenormand et al. | |
| 6,844,743 B2 | 1/2005 | Lenormand et al. | |
| 6,943,566 B2 | 9/2005 | Florin et al. | |
| 7,249,506 B2* | 7/2007 | Scardovi | G01F 23/263 |
| | | | 324/663 |
| 7,258,005 B2 | 8/2007 | Nyce | |
| 7,712,364 B2 | 5/2010 | Radhakrishnan et al. | |
| 8,096,178 B2 | 1/2012 | Wernet et al. | |
| 8,117,910 B2 | 2/2012 | Getman | |
| 8,181,516 B2 | 5/2012 | Naydenov | |
| 8,225,654 B2 | 7/2012 | Muerset | |
| 9,261,395 B2* | 2/2016 | Shearer | G01F 23/00 |
| 2005/0172712 A1* | 8/2005 | Nyce | G01F 23/268 |
| | | | 73/304 C |
| 2009/0187357 A1 | 7/2009 | Ho et al. | |
| 2010/0126268 A1 | 5/2010 | Baily et al. | |
| 2010/0154534 A1* | 6/2010 | Hampton | G01F 23/265 |
| | | | 73/304 C |
| 2010/0186526 A1 | 7/2010 | Thompson et al. | |
| 2010/0313654 A1 | 12/2010 | Malinovskiy et al. | |
| 2010/0326186 A1 | 12/2010 | Kamp et al. | |
| 2010/0326282 A1 | 12/2010 | Carbonini et al. | |
| 2012/0123233 A1* | 5/2012 | Cohen | A61B 10/007 |
| | | | 600/345 |
| 2012/0212987 A1* | 8/2012 | Weir | H02M 7/5387 |
| | | | 363/132 |
| 2015/0122015 A1* | 5/2015 | Leppard | G01F 23/263 |
| | | | 73/304 C |

FOREIGN PATENT DOCUMENTS

| | | |
|---|---|---|
| DE | 102010030362 A1 | 12/2011 |
| EP | 2515090 A1 | 10/2012 |
| EP | 2626675 A1 | 8/2013 |
| GB | 1392567 A | 4/1975 |

OTHER PUBLICATIONS

Search Report issued by the European Patent Office on Nov. 17, 2014 for European Patent application No. 14181235.4.

* cited by examiner

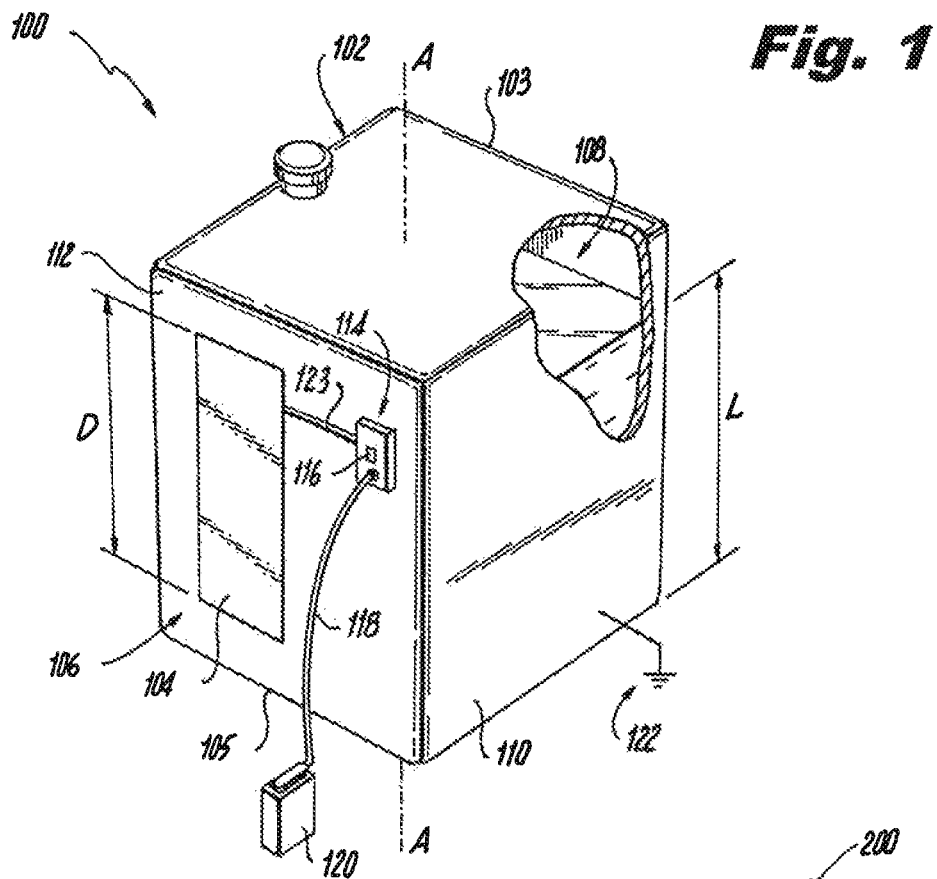
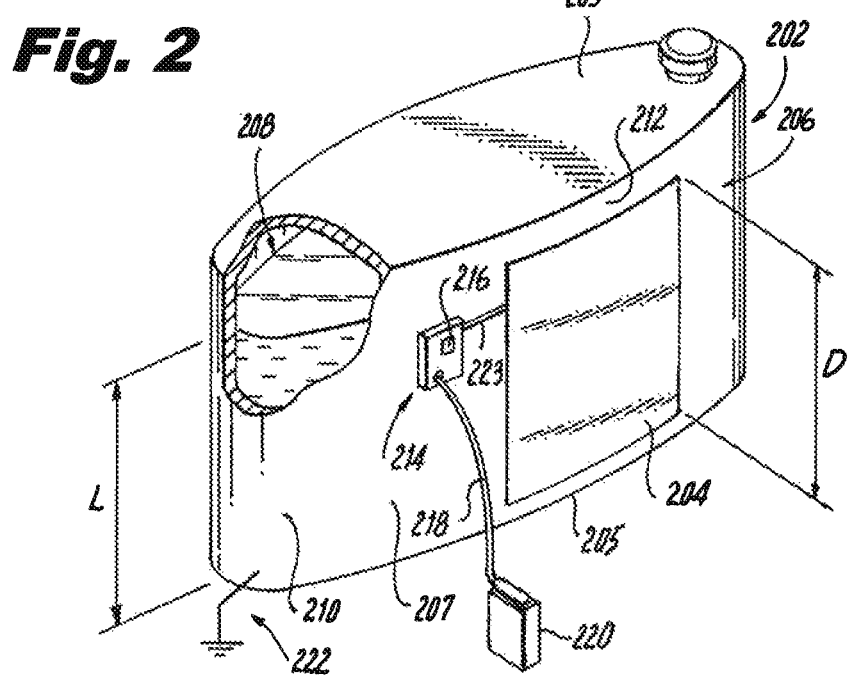

300

```
┌─────────────────────────────────────┐
│  SUPPLYING A VOLTAGE TO AN ELECTRODE │ ─ 302
│     WITH A VOLTAGE SUPPLY SOURCE     │
└─────────────────────────────────────┘
                  │
                  ▼
       ┌──────────────────────┐
       │  COLLECTING A CHARGE │ ─ 304
       │    ON THE ELECTRODE  │
       └──────────────────────┘
                  │
                  ▼
┌───────────────────────────────────────┐
│   SENSING THE COLLECTED CHARGE ON THE │ ─ 306
│       ELECTRODE WITH A CAPACITANCE    │
│     SENSOR BY SENSING A CONTINUOUS    │
│   ANALOG SIGNAL EMITTED BY THE ELECTRODE │
└───────────────────────────────────────┘
                  │
                  ▼
┌───────────────────────────────────────┐
│  DETERMINING A LIQUID LEVEL IN A VESSEL │ ─ 308
│    BASED ON THE COLLECTED CHARGE BY   │
│   CORRELATING THE COLLECTED CHARGE TO │
│    AN AREA OF A DIELECTRIC MATERIAL IN│
│  CONTACT WITH LIQUID DISPOSED IN THE VESSEL │
└───────────────────────────────────────┘
```

*Fig. 3*

LIQUID LEVEL SENSING SYSTEMS

CROSS-REFERENCE TO RELATED APPLICATIONS

This application claims benefit to U.S. Provisional Patent Application No. 61/868,412 filed on Aug. 21, 2013 and is a continuation-in-part of U.S. patent application Ser. No. 13/765,231 filed Feb. 12, 2013, which claims benefit to U.S. Provisional Patent Application No. 61/598,320 filed Feb. 13, 2012, all of which are incorporated by reference herein in their entirety.

BACKGROUND OF THE INVENTION

1. Field of the Invention

The present disclosure relates to liquid level sensing systems, and more particularly to liquid level sensing systems for potable water tanks.

2. Description of Related Art

Traditional liquid level sensing technology involves point level sensors to determine the level of a liquid in a vessel. This tends to cause corrosion of the sensor due to direct contact with the liquid. Placing the sensor inside the vessel can also pose mechanical obstruction issues with internal baffling. Traditional point level sensors also include protrusions that present challenges to fitting the vessel into the limited space typically allotted for some installations, such as aircraft installations.

Such conventional methods and systems have generally been considered satisfactory for their intended purpose. However, there still remains a need in the art for liquid level sensing systems with increased reliability, durability and ease of installation. The present disclosure provides a solution for this need.

SUMMARY OF THE INVENTION

A liquid level sensing system includes a vessel and an electrode. The vessel includes a vessel wall separating a vessel interior from a vessel exterior. The electrode is mounted to an exterior side of the vessel wall spanning a distance corresponding to a desired-level-determining range. The vessel wall is a dielectric gap between the electrode and the vessel interior. The electrode is configured to collect a charge corresponding to a liquid level.

In accordance with certain embodiments, capacitance detection circuitry can be operatively connected to the electrode. The capacitance detection circuitry can be configured to sense the collected charge on the electrode. An electrical line can connect the electrode to the capacitance detection circuitry. The capacitance detection circuitry can be operatively connected to a liquid level determination component for determining a liquid level based on capacitance by correlating the collected charge to an area of a dielectric material in contact with the liquid. The vessel wall can include a curved surface. The electrode, the capacitance detection circuitry and/or the liquid level determination component can be configured to remove nonlinearity effects on a liquid level measurement due to the curved surface.

The vessel can include a top and a bottom, wherein a vessel axis is defined therebetween. The desired-level-determining range can extend along an axis parallel to the vessel axis. A voltage-supply source can be operatively connected to the electrode for supplying a voltage to the electrode. An electrical line can connect the electrode to a voltage-supply source. The vessel can include an insulating material. The insulating material can be plastic. The vessel can be a tank installed on an aircraft.

A method for determining a liquid level in a vessel includes collecting a charge on an electrode, sensing the collected charge on the electrode with a capacitance sensor through an electrical line, and determining a liquid level in a vessel based on the collected charge sensed by the capacitance sensor. The method can also include supplying a voltage to the electrode with a voltage supply source such that the electrode can collect the charge. Determining a liquid level can include correlating the collected charge to an area of a dielectric material in contact with liquid disposed in the vessel. The vessel can include the dielectric material and the liquid can act as one plate of a capacitor while the electrode can act as a second plate of the capacitor. Sensing the collected charge on the electrode can include sensing a continuous analog signal emitted by the electrode.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein:

FIG. 1 is a perspective view of an exemplary embodiment of a vessel with a non-invasive single probe liquid level sensing system constructed in accordance with the present disclosure showing an electrode, a vessel, capacitance detection circuitry and a liquid level determination component;

FIG. 2 is a perspective view of an exemplary embodiment of a vessel with a non-invasive single probe liquid level sensing system constructed in accordance with the present disclosure showing a vessel with a curved surface; and FIG. 3 is a flow chart of an exemplary method for determining a liquid level in a vessel in accordance with the invention, showing operations for determining a liquid level in the vessel based on the collected charge on an electrode.

DETAILED DESCRIPTION OF THE PREFERRED EMBODIMENTS

Reference will now be made to the drawings wherein like reference numerals identify similar structural features or aspects of the subject disclosure. For purposes of explanation and illustration, and not limitation, a perspective view of an exemplary embodiment of liquid level sensing system in accordance with the disclosure is shown in FIG. 1 and is designated generally by reference character 100. Other embodiments of liquid level sensing systems in accordance with the disclosure, or aspects thereof, are provided in FIGS. 2-3, as will be described. The systems and methods described herein can be used to improve ease of installation and to reduce corrosion as compared to traditional liquid level sensing systems.

As shown in FIG. 1, a non-invasive single probe liquid level sensing system 100 includes a vessel 102 and an electrode 104. Vessel 102 includes a vessel wall 106 separating a vessel interior 108 from a vessel exterior 110. Vessel wall 106 is a dielectric gap between electrode 104 and vessel interior 108. Electrode 104 is mounted to an exterior side 112 of vessel wall 106 spanning a distance D corresponding to a desired-level-determining range. Those skilled in the art will readily appreciate that electrode 104 can be made out of any suitable metal, such as copper. Those skilled in the art will readily appreciate that by mounting electrode 104 to vessel exterior 110, electrode 104 is removed from potential contact with liquid within the vessel interior 108, thereby reducing corrosion issues due to electrode 104 contact with liquid. Further, the direct application of electrode 104 to exterior side 112 of vessel wall 106 tends to result in a very compact, smooth and uninterrupted design. Those skilled in the art will readily appreciate that this compact, smooth and uninterrupted design can increase the ease of installation and manufacture.

Vessel 102 includes a top 103 and a bottom 105, wherein a vessel axis A is defined therebetween. Desired-level-determining range D extends along electrode 104 parallel to vessel axis A. Vessel 102 is made out of an insulating material, e.g. a dielectric material, to act as a dielectric between electrode 104 and vessel interior 108. Those skilled in the art will readily appreciate that the insulating material can be plastic, and/or any other suitable non-metallic material. Those skilled in the art will also readily appreciate that vessel 102 can be a tank installed on an aircraft, or can be used in a variety of suitable applications.

With continued reference to FIG. 1, an electrical line 123 connects electrode 104 to capacitance detection circuitry 114. Electrical line 118 connects capacitance detection circuitry 114 to a voltage-supply source 120. To determine a liquid level L within vessel 102, voltage supply source 120 supplies a voltage to electrode 104. Electrode 104 is configured to collect a charge corresponding to liquid level L. For example, the charge collected on electrode 104 corresponds to the area of the insulation, e.g. area of vessel 102 between electrode 104 and contact with liquid. Capacitance detection circuitry 114 senses the collected charge on electrode 104 though electrical line 123. Those skilled in the art will readily appreciate that there can be any number of suitable electrical lines, e.g. electrical lines 118 or 123, connecting electrode 104 to voltage supply source 120, and/or to capacitance detection circuitry 114.

Capacitance detection circuitry 114 is operatively connected to a liquid level determination component 116 for determining the liquid level L based on the collected charge sensed by capacitance detection circuitry 114. Those skilled in the art will readily appreciate that liquid level sensing system 100 allows for a continuous analog signal, which correlates to the liquid level in vessel 102. Those skilled in the art will also readily appreciate that a continuous analog signal can allow for infinite resolution of water level as compared with traditional point source level sensing systems. Electrode 104 acts as one plate of a capacitor, while liquid disposed within vessel interior 108 acts as the second plate. As liquid level L increases, a greater portion of distance D corresponding to a desired-level-determining range of electrode 104 is indirectly covered with liquid, increasing the capacitance. Determining capacitance can therefore allow for a determination of liquid level L. It is contemplated that the liquid can have an electrical ground 122. The circuitry, e.g. liquid level determination component 116 and capacitance detection circuitry 114, can reside on a circuit card which is less than one square inch and operates on 28 VDC aircraft power.

As shown in FIG. 2, a non-invasive single probe liquid level sensing system 200 is similar to liquid level sensing system 100, described above. Liquid level sensing system 200 includes a vessel 202 having a vessel wall 206 with a curved surface 207. Those skilled in the art will readily appreciate that an electrode 204, capacitance detection circuitry 214, and/or a liquid level determination component 216 can be configured to remove nonlinearity effects on a liquid level measurement due to curved surface 207, or any other non-linear surface of vessel 202. Now with reference to FIG. 3, a method 300 for determining a liquid level, e.g. liquid level L, in a vessel, e.g. vessel 102, includes operations 302, 304, 306 and 308. Operation 302 includes supplying a voltage to an electrode, e.g. electrode 104, with a voltage supply source, e.g. voltage supply source 120. Operation 304 includes collecting a charge on the electrode. Operation 306 includes sensing the collected charge on the electrode with a capacitance sensor, e.g. capacitance detection circuitry 114, through an electrical line, e.g. electrical line 123. Operation 306 includes sensing a continuous analog signal, as described above, emitted by the electrode.

With continued reference to FIG. 3, operation 308 includes determining the liquid level in the vessel based on the collected charge sensed by the capacitance sensor. Operation 308 includes correlating the collected charge to an area of a dielectric material in contact with the liquid disposed in the vessel. The vessel can include the dielectric material and the liquid can act as one plate of a capacitor, while the electrode can act as a second plate of the capacitor, as described above.

The methods and systems of the present disclosure, as described above and shown in the drawings, provide for liquid level sensing systems with superior properties including reduced corrosion, and improved ease of manufacture and installation. While the apparatus and methods of the subject disclosure have been shown and described with reference to preferred embodiments, those skilled in the art will readily appreciate that changes and/or modifications may be made thereto without departing from the spirit and scope of the subject disclosure.

What is claimed is:

1. A liquid level sensing system comprising:
   a vessel including a vessel wall separating a vessel interior from a vessel exterior; and
   a single electrode mounted to an exterior side of the vessel wall spanning a distance corresponding to a desired-level-determining range, wherein the electrode is configured to collect a charge corresponding to a liquid level, and wherein the vessel wall is a dielectric gap between the electrode and the vessel interior.

2. A liquid level sensing system as recited in claim 1, further comprising capacitance detection circuitry operatively connected to the electrode, wherein the capacitance detection circuitry is configured to sense the collected charge on the electrode.

3. A liquid level sensing system as recited in claim 2, further comprising an electrical line connecting the electrode to the capacitance detection circuitry.

4. A liquid level sensing system as recited in claim 2, wherein the capacitance detection circuitry is operatively connected to a liquid level determination component for determining a liquid level based on capacitance by correlating the collected charge to an area of a dielectric material in contact with the liquid.

5. A liquid level sensing system as recited in claim 4, wherein the vessel wall includes a curved surface, wherein at least one of the electrode, the capacitance detection circuitry and the liquid level determination component are configured to remove nonlinearity effects on a liquid level measurement due to the curved surface.

6. A liquid level sensing system as recited in claim 1, wherein the vessel includes a top and a bottom, wherein a vessel axis is defined therebetween, and wherein the desired-level-determining range extends along an axis parallel to the vessel axis.

7. A liquid level sensing system as recited in claim 1, further comprising a voltage-supply source operatively connected to the electrode for supplying a voltage to the electrode.

8. A liquid level sensing system as recited in claim 1, further comprising an electrical line connecting the electrode to a voltage-supply source.

9. A liquid level sensing system as recited in claim 1, wherein the vessel includes an insulating material.

10. A liquid level sensing system as recited in claim 9, wherein the insulating material includes a plastic material.

11. A liquid level sensing system as recited in claim 1, wherein the vessel is a tank installed on an aircraft.

12. A method for determining a liquid level in a vessel:
collecting a charge on an electrode;
sensing the collected charge on the electrode with a capacitance sensor through an electrical line; and
determining a liquid level in a vessel based on the collected charge sensed by the capacitance sensor.

13. A method as recited in claim 12, further comprising supplying a voltage to the electrode with a voltage supply source such that the electrode can collect the charge.

14. A method as recited in claim 12, wherein determining a liquid level includes correlating the collected charge to an area of a dielectric material in contact with liquid disposed in the vessel, wherein the vessel includes the dielectric material, and wherein the liquid acts as one plate of a capacitor and the electrode acts as a second plate of the capacitor.

15. A method as recited in claim 12, wherein sensing the collected charge on the electrode includes sensing a continuous analog signal emitted by the electrode.

16. A liquid level sensing system comprising:
a vessel including a vessel wall separating a vessel interior from a vessel exterior; and
a single electrode mounted to an exterior side of the vessel wall spanning a distance corresponding to a desired-level-determining range, wherein the electrode is configured to collect a charge corresponding to a liquid level, and wherein the vessel wall is a dielectric gap between the electrode and the vessel interior.

* * * * *

UNITED STATES PATENT AND TRADEMARK OFFICE
CERTIFICATE OF CORRECTION

PATENT NO. : 9,574,928 B2  
APPLICATION NO. : 14/318181  
DATED : February 21, 2017  
INVENTOR(S) : Sabeshan Sean Periyathamby et al.

Page 1 of 1

It is certified that error appears in the above-identified patent and that said Letters Patent is hereby corrected as shown below:

In the Claims

Column 6 Line 17: the word "a" should be removed and replaced by adding --an--

Column 6 Line 17: the word "single" should be removed

Signed and Sealed this  
Ninth Day of February, 2021

Drew Hirshfeld  
*Performing the Functions and Duties of the*  
*Under Secretary of Commerce for Intellectual Property and*  
*Director of the United States Patent and Trademark Office*